United States Patent
Rindfleisch (10) Patent No.: US 8,312,956 B2
(45) Date of Patent: Nov. 20, 2012

(54) AUTO INTER-AXLE DIFFERENTIAL LOCK ENGAGEMENT FOR IMPROVED BRAKING CAPACITY

(75) Inventor: David Frederick Rindfleisch, Asbury, IA (US)

(73) Assignee: Deere & Company, Moline, IL (US)

( * ) Notice: Subject to any disclaimer, the term of this patent is extended or adjusted under 35 U.S.C. 154(b) by 31 days.

(21) Appl. No.: 13/027,966

(22) Filed: Feb. 15, 2011

(65) Prior Publication Data

US 2012/0205182 A1 Aug. 16, 2012

(51) Int. Cl.
*B60K 23/04* (2006.01)
*B60K 17/35* (2006.01)
*F16H 48/20* (2006.01)

(52) U.S. Cl. ......... 180/338; 180/249; 280/677; 475/84

(58) Field of Classification Search ............... 180/197, 180/233, 248, 249, 338; 192/218; 280/676, 280/677, 682; 303/191, 192; 475/84
See application file for complete search history.

(56) References Cited

U.S. PATENT DOCUMENTS

| | | | | |
|---|---|---|---|---|
| 2,922,482 A * | 1/1960 | Fisher | | 180/236 |
| 5,995,895 A * | 11/1999 | Watt et al. | | 701/50 |
| 6,085,138 A * | 7/2000 | Smith et al. | | 701/51 |
| 6,189,643 B1 * | 2/2001 | Takahashi et al. | | 180/248 |
| 6,199,964 B1 * | 3/2001 | Ota et al. | | 303/192 |
| 6,524,207 B2 * | 2/2003 | Murakami et al. | | 475/86 |
| 6,805,651 B2 * | 10/2004 | Lipman | | 475/221 |
| 7,211,017 B2 | 5/2007 | Green et al. | | |
| 7,766,104 B2 * | 8/2010 | Newberry et al. | | 180/24.09 |
| 2002/0033292 A1 * | 3/2002 | Uematsu et al. | | 180/244 |
| 2008/0164664 A1 * | 7/2008 | Anderson et al. | | 280/5.5 |
| 2008/0221771 A1 * | 9/2008 | Olsson | | 701/83 |
| 2008/0255735 A1 * | 10/2008 | Marathe et al. | | 701/50 |
| 2010/0072021 A1 * | 3/2010 | Kingston et al. | | 192/218 |

FOREIGN PATENT DOCUMENTS

| | | | |
|---|---|---|---|
| EP | 1338459 A1 * | 8/2003 | |
| JP | 2000302063 A * | 10/2000 | |
| WO | WO 2008115104 A1 * | 9/2008 | |

OTHER PUBLICATIONS

"Chassis" Definition, Merriam-Webster Online Dictionary, available at http://www.merriam-webster.com/dictionary/chassis (last visited May 7, 2012).*
Illerhag, Heikki et al., Study of Driveline Functionality During Off-Road Driving of an Articulated Hauler, 15th European ADAMS User's Conference, Nov. 15-17, 2000, Rome, Italy.

* cited by examiner

*Primary Examiner* — Joseph Rocca
(74) *Attorney, Agent, or Firm* — Faegre Baker Daniels LLP (57) ABSTRACT

A work vehicle is provided having a front wheel assembly and a rear wheel assembly. The front wheel assembly may include a front axle assembly, and the rear wheel assembly may include a rear axle assembly. The vehicle may include a braking system configured to transfer front axle braking torque to the rear axle assembly when the vehicle is positioned on a slope.

31 Claims, 6 Drawing Sheets

AUTO INTER-AXLE DIFFERENTIAL LOCK ENGAGEMENT FOR IMPROVED BRAKING CAPACITY

FIELD

The present disclosure relates to a braking system for a vehicle, and more particularly to an automatic inter-axle differential lock for increasing the braking capacity of a work vehicle.

BACKGROUND AND SUMMARY

Work vehicles, such as articulated work vehicles, are known in the art. For example, articulated dump trucks (ADT's) typically include a cab portion having a first frame supporting an operator cab, and a trailer portion having a second frame supporting a bin. The bin may be configured to contain a load and is typically coupled to an actuator for angular movement relative to the second frame. The first frame and the second frame may be operably coupled through an articulation joint. A front wheel assembly coupled to the first frame may provide rolling support to the cab portion, and a rear wheel assembly coupled to the second frame may provide rolling support to the trailer portion.

When a work vehicle, such as an ADT, is inclined on a slope with the front wheel assembly positioned higher than the rear wheel assembly, the vehicle may experience a weight transfer towards the rear of the vehicle. Accordingly, the front axle braking force applied to the ground may be limited due to reduced traction of the front wheels.

According to an embodiment of the present disclosure, a work vehicle is provided including a chassis and a front wheel assembly supporting the chassis. The front wheel assembly includes a first axle and a pair of wheels coupled to the first axle. A front brake is coupled to the front wheel assembly and configured to apply a braking force to the front wheel assembly to inhibit rotation of the first axle. A rear wheel assembly supports the chassis and includes a second axle and a pair of wheels coupled to the second axle. A drive shaft is coupled between the front wheel assembly and the rear wheel assembly. A differential is coupled to the drive shaft and includes a lock device configured to substantially block operation of the differential. A direction sensor is configured to detect a moving direction of the vehicle. A controller in communication with the differential and the direction sensor is configured to engage the lock device upon detection of the vehicle moving in a reverse direction.

In another exemplary embodiment of the present disclosure, a work vehicle is provided including a chassis and a front wheel assembly operably coupled to the chassis to support the chassis. The front wheel assembly includes a first axle and a pair of wheels coupled to the first axle. A rear wheel assembly is operably coupled to the chassis to support the chassis. The rear wheel assembly includes a second axle and a pair of wheels coupled to the second axle. A drive shaft is coupled between the front wheel assembly and the rear wheel assembly. A differential coupled to the drive shaft includes a lock device configured to substantially lock the differential. A first sensor is configured to detect a slope of the ground, and a second sensor is configured to detect a speed of the vehicle. A controller in communication with the differential and the first and second sensors is configured to engage the lock device upon detection of the vehicle being at least one of stopped on a slope and moving down a slope.

In yet another exemplary embodiment of the present disclosure, a work vehicle is provided including a chassis and a front wheel assembly coupled to the chassis to support the chassis. The front wheel assembly includes a first axle and a pair of wheels coupled to the first axle. A rear wheel assembly coupled to the chassis to support the chassis includes a second axle and a pair of wheels coupled to the second axle. A front brake is coupled to the front wheel assembly and is configured to apply a braking torque to the front wheel assembly to inhibit rotation of the first axle. The work vehicle includes a detection means for detecting an operating condition of the vehicle. The work vehicle further includes a transfer means for transferring a braking torque from the front wheel assembly to the rear wheel assembly. The work vehicle further includes a means for activating the transfer means upon detection of the operating condition by the detection means.

BRIEF DESCRIPTION OF THE DRAWINGS

The above-mentioned and other features and advantages of the invention, and the manner of attaining them, will become more apparent and the disclosure itself will be better understood by reference to the following description taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention in any manner.

DETAILED DESCRIPTION

The embodiments disclosed herein are not intended to be exhaustive or to limit the disclosure to the precise forms disclosed in the following detailed description. Rather, the embodiments are chosen and described so that others skilled in the art may utilize their teachings.

Figure 1:
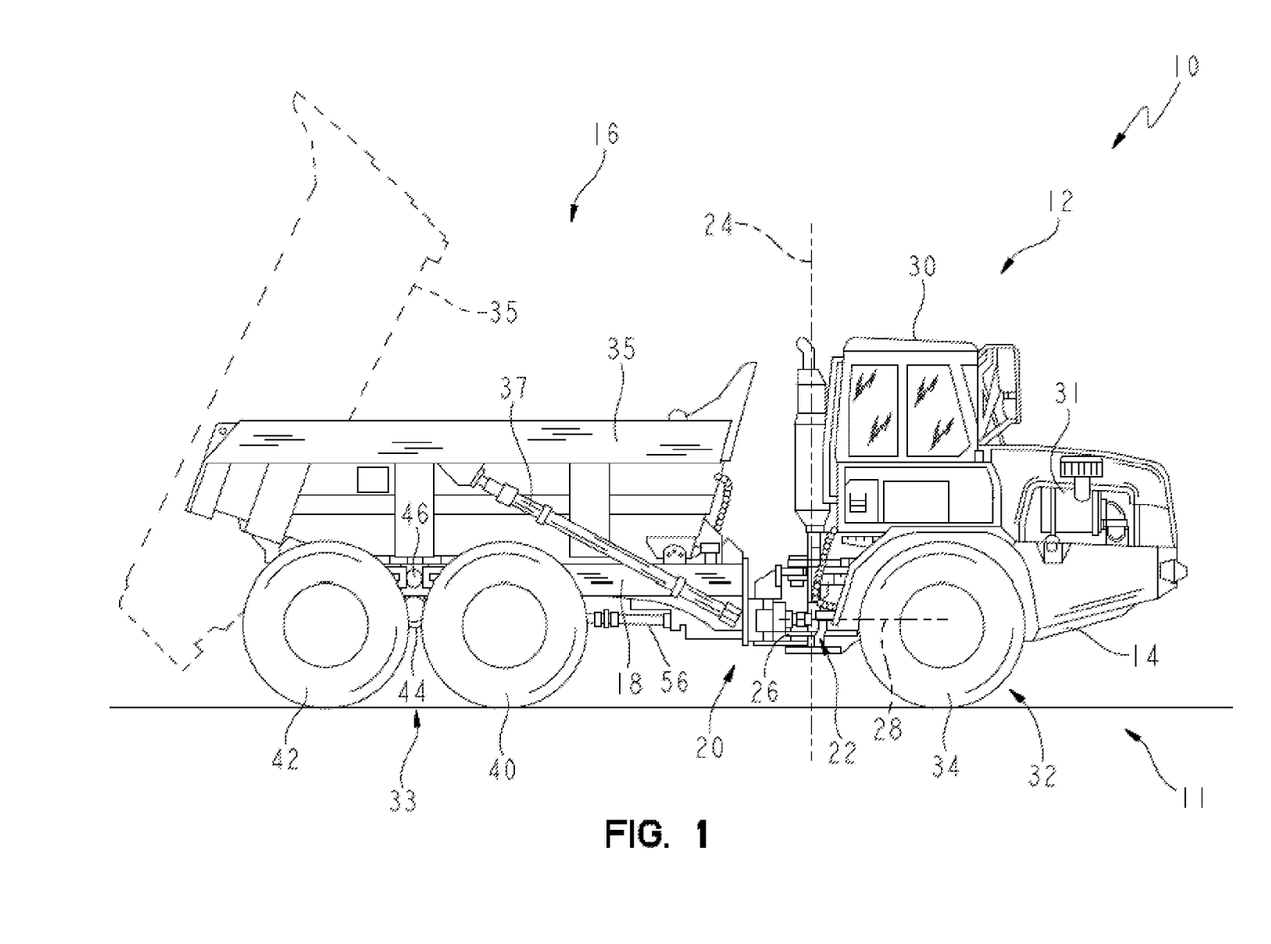
FIG. 1 illustrates an exemplary articulated vehicle incorporating the braking system of the present disclosure.

Referring initially to FIG. 1, an exemplary articulated vehicle 10 includes a chassis 11 having a first or cab portion 12 and a second or trailer portion 16. Cab portion 12 includes a first frame 14, and trailer portion 16 includes a second frame 18. First frame 14 is connected to second frame 18 through a coupling assembly 20. In the illustrated embodiment, coupling assembly 20 includes a pivot frame coupling 22 and a rotational frame coupling 26. Pivot frame coupling 22 provides for articulated movement, or pivoting, of second frame 18 relative to first frame 14 about a vertical axis 24. Rotational frame coupling 26 provides for rotational movement of second frame 18 relative to first frame 14 about a longitudinal axis 28. In one embodiment, vehicle 10 includes one or more hydraulic actuators configured to control the angle between first and second frames 14, 18 for steering vehicle 10.

First frame 14 illustratively supports an operator's cab 30 and an engine 31 for propelling vehicle 10. A first or front wheel assembly 32 supports cab portion 12 and is operably coupled to first frame 14. First wheel assembly 32 includes a pair of wheels 34 for providing rolling support to cab portion 12. A dump body or bin 35 for containing a load is supported by second frame 18. An actuator, such as a hydraulic cylinder 37, may be coupled to bin 35 for angularly elevating bin 35 relative to second frame 18 (as shown in phantom in FIG. 1).

Figure 2:
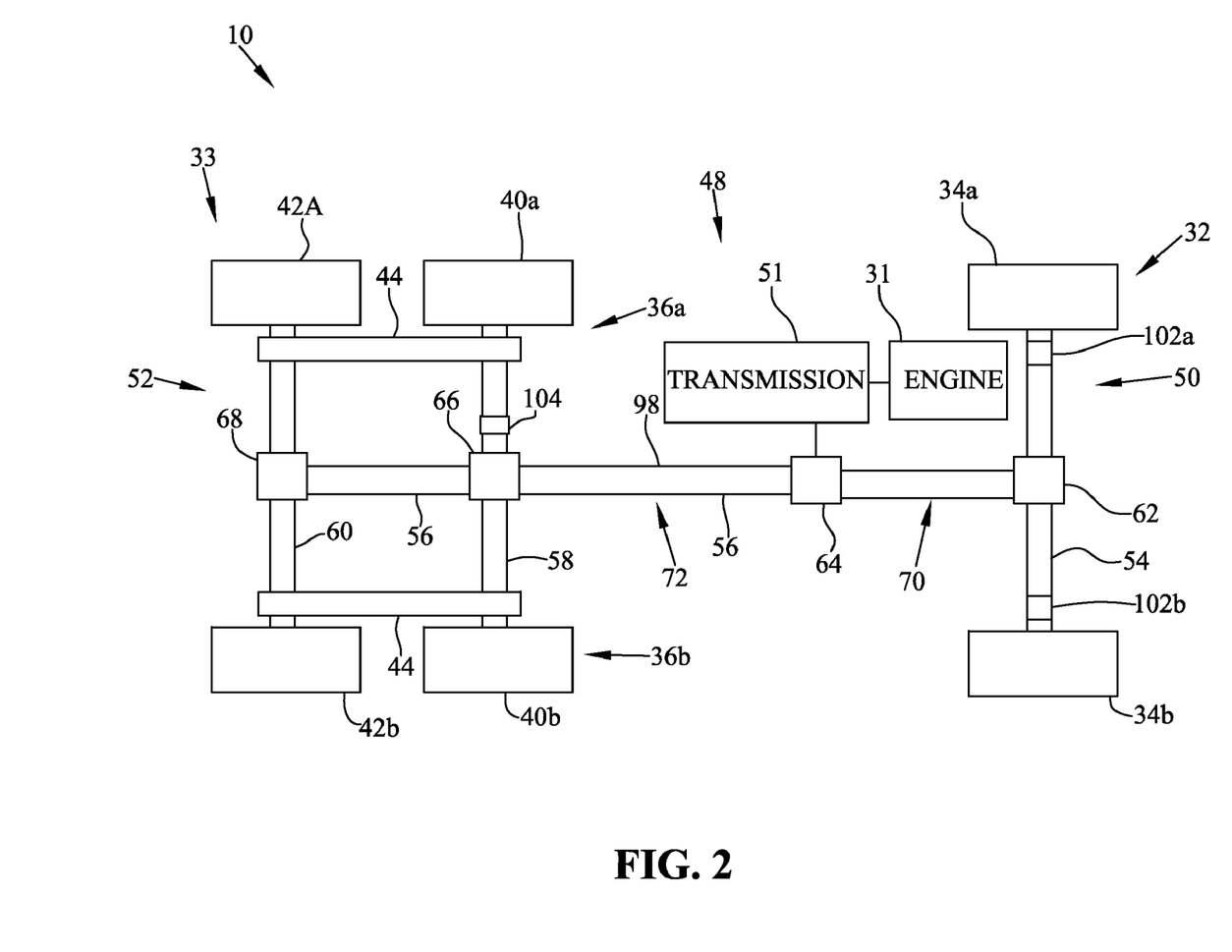
FIG. 2 illustrates a top schematic view of the articulated vehicle of FIG. 1 with a front wheel assembly and a rear wheel assembly.

A second or rear wheel assembly 33 is operably coupled to second frame 18 for supporting trailer portion 16. In the illustrated embodiment, rear wheel assembly 33 includes front wheels 40 and rear wheels 42. Referring to FIG. 2, rear wheel assembly 33 illustratively includes a left rear wheel assembly 36a and a right rear wheel assembly 36b. Left and right rear wheel assemblies 36a, 36b each illustratively include a front wheel 40a, 40b and a rear wheel 42a, 42b, respectively. In the illustrated embodiment, each of front wheels 40a, 40b and rear wheels 42a, 42b are rotatably coupled to a tandem or walking beam 44 (see also FIG. 6). As illustrated in FIG. 1, tandem 44 is pivotally coupled to second frame 18 through a pivot tandem coupling 46. Operation of tandem 44 facilitates pivoting movement of front wheel 40 relative to rear wheel 42 about coupling 46, thereby facilitating continuous ground engagement by wheels 40 and 42. In the illustrated embodiment of FIGS. 1 and 6, coupling 46 consists of a rigid shaft that extends from second frame 18 to tandem 44 to provide the pivoting therebetween. Other than rotation, shaft 46 illustratively has a fixed position relative to second frame 18 such that shaft 46 moves vertically, longitudinally, and laterally with second frame 18.

Figure 6:
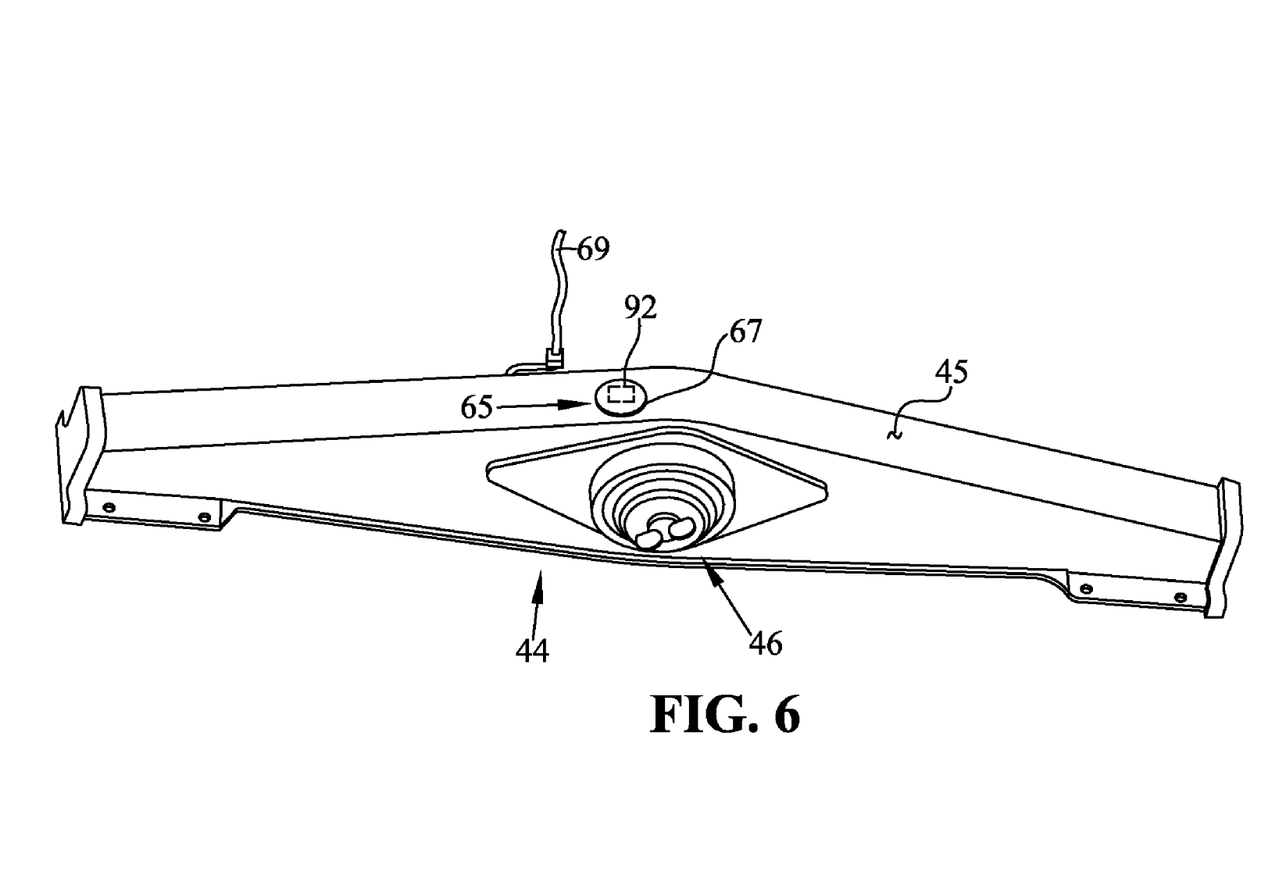
FIG. 6 illustrates an exemplary walking beam of the vehicle of FIG. 1 including a weight sensor.

In the illustrated embodiment, front and rear wheels 40 and 42 are at a fixed distance from shaft 46. As a result, the vertical location of the axis of rotation of front and rear wheels 40 and 42 relative to second frame 18 is independent of the load carried by bin 35. In the illustrated embodiment, because rigid shaft 46 is directly coupled to second frame 18 and tandem 44, the spring constant between second frame 18 and tandem 44 is large so that there is substantially no body roll between second frame 18 and tandem 44.

Vehicle 10 may include alternative wheel assembly configurations. For example, fewer or more wheels and/or axles may support trailer portion 16 and/or cab portion 12.

Referring to FIG. 2, an exemplary drive train 48 of vehicle 10 is illustrated. Engine 31 is coupled to a drive shaft 56 via a transmission 51 for driving front and rear wheel assemblies 32, 33. In the illustrative embodiment, transmission 51 is an automatic transmission, although other types of transmissions may be provided. Front wheel assembly 32 includes a front axle assembly 50, and rear wheel assembly 33 includes a bogie or rear axle assembly 52. Front axle assembly 50 includes a front axle 54 coupled between wheels 34a, 34b and a differential 62 coupled to front axle 54. Bogie axle assembly 52 includes a first rear axle 58 coupled between wheels 40a, 40b and a second rear axle 60 coupled between wheels 42a, 42b. In the illustrated embodiment, first axle 58 includes a first differential 66 and second axle 60 includes a second differential 68. Tandems 44 of left and right rear wheel assemblies 36a, 36b are further included in bogie axle assembly 52 and coupled to first and second axles 58, 60.

Drive shaft 56 is coupled to front axle 54 of front axle assembly 50 and to first and second axles 58, 60 of bogie axle assembly 52. Drive shaft 56 is configured to provide torque from transmission 51 and engine 31 to front axle 54 and first and second axles 58, 60 for propelling vehicle 10. In particular, differential 62 of front axle 54 is coupled to drive shaft 56 and is configured to provide torque from drive shaft 56 to each wheel 34a, 34b while allowing wheels 34a, 34b to rotate at different speeds. Similarly, differentials 66, 68 of respective axles 58, 60 are coupled to drive shaft 56 and are configured to provide torque from drive shaft 56 to respective wheels 40, 42 while allowing individual wheels 40, 42 to rotate at different speeds.

In the illustrated embodiment, drive shaft 56 includes an inter-axle differential 64 configured to allow axles 58, 60 to rotate at different speeds than front axle 54 during operation of vehicle 10. As illustrated in FIG. 2, drive shaft 56 includes a first portion 70 coupled between front axle assembly 50 and differential 64 and a second portion 72 coupled between differential 64 and bogie axle assembly 52. Front axle 54 is coupled to first portion 70, and first and second axles 58, 60 are coupled to second portion 72. Differential 64 serves to allow first portion 70 and second portion 72 of drive shaft 56 to rotate at different speeds during operation of vehicle 10, thereby allowing front axle 54 to rotate at different speeds than first and second axles 58, 60. In the illustrated embodiment, transmission 51 is coupled to differential 64 for driving drive shaft 56. In one embodiment, transmission 51 and differential 64 are provided in a single assembly, and an output shaft 98 of transmission 51 forms a part of second portion 72 of drive shaft 56. Alternative configurations of coupling transmission 51 to drive shaft 56 may be provided.

Differential 64 includes a lock 94 (see FIG. 3) for selectively disengaging or locking differential 64. In one embodiment, lock 94 includes a clutch assembly. In particular, when lock 94 is engaged or closed, differential 64 is in a locked state, and first portion 70 of drive shaft 56 is locked to second portion 72 to rotate therewith. When lock 94 is disengaged or opened, differential 64 is in an unlocked and operational state and is configured to allow first portion 70 and second portion 72 to rotate at different speeds. As such, front axle 54 of front wheel assembly 32 may rotate at a different speed than first and second axles 58, 60 of rear wheel assembly 33 when lock 94 is disengaged. In the illustrated embodiment, a controller, such as exemplary controller 82 of FIG. 3, controls operation of inter-axle differential 64 and differential lock 94. Differentials 62, 66, 68 may also include locks or clutches.

Figure 3:
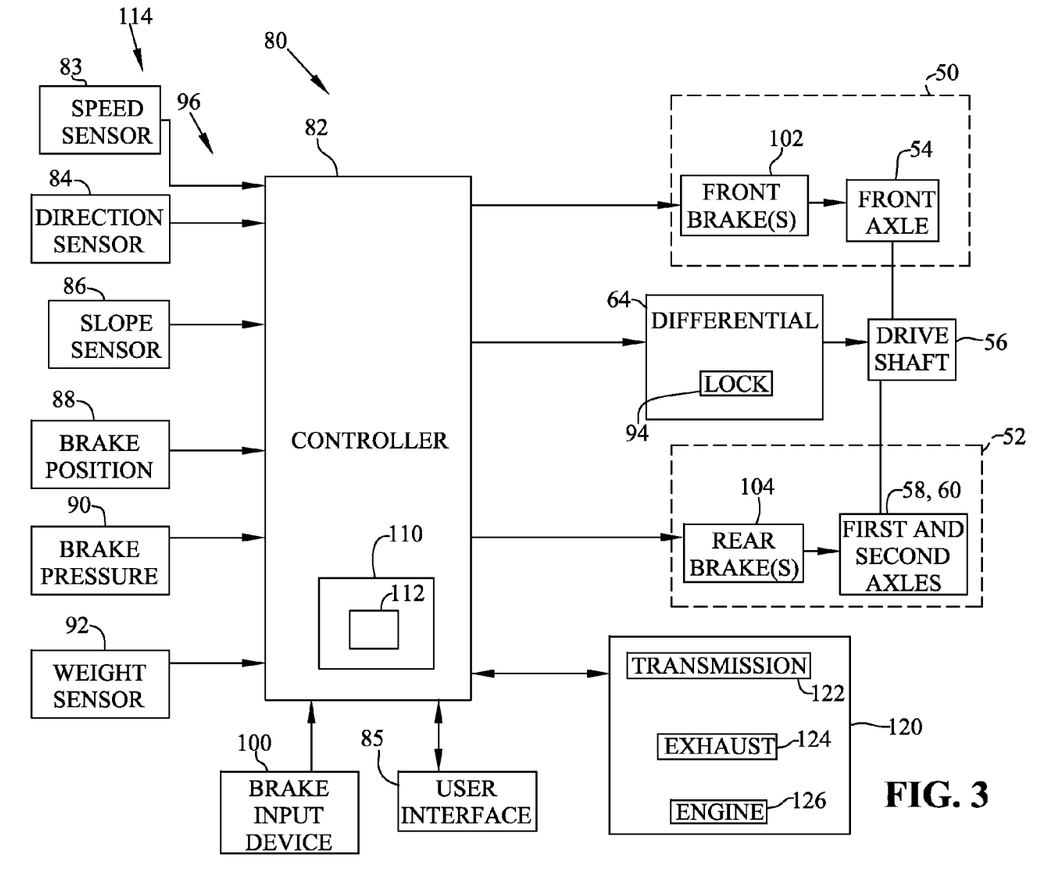
FIG. 3 illustrates a representative view of an exemplary braking system of the vehicle of FIG. 1.

Lock 94 may be configured to completely lock differential 64 or to partially lock differential 64. For example, lock 94 may limit rotation of front portion 70 of drive shaft 56 relative to second portion 72 of drive shaft 56 without completely locking front portion 70 to second portion 72. As described herein, lock 94 may comprise a clutch assembly that blocks rotation of front portion 70 relative to second portion 72 based on the frictional holding capacity of the clutch assembly.

An exemplary braking system 80 of vehicle 10 is illustrated in FIG. 3. Braking system 80 includes front brakes 102 coupled to front axle 54 of front axle assembly 50 and rear brakes 104 coupled to at least one of axles 58, 60 of bogie axle assembly 52. In one embodiment, two front brakes 102a, 102b are coupled to front axle 54 for applying a braking force to front axle 54, and a rear brake 104 is coupled to first rear axle 58 for applying a braking force to both rear axles 58, 60, as illustrated in FIG. 2. In particular, rear brake 104 coupled to first rear axle 58 may apply braking torque to second rear axle 60 through drive shaft 56. Front axle 54 and rear axles 58, 60 may have other brake configurations. In one embodiment, brakes 102, 104 are hydraulically-actuated disc brakes, although brakes 102, 104 may be other suitable types.

Referring to FIG. 3, controller 82 of braking system 80 is configured to control brakes 102, 104 and differential 64. Controller 82 is configured to control brakes 102, 104 based on input from a brake input device 100. In one embodiment, brake input device 100 includes a pedal or lever, but may include other suitable input devices for applying a brake. Controller 82 controls inter-axle differential 64 and differential lock 94 based on various vehicle parameters and user inputs, as described herein. Controller 82 may also control the operation of differentials 62, 66, 68 illustrated in FIG. 2. Controller 82 may be a vehicle control unit of vehicle 10, but may alternatively be a separate controller from the vehicle control unit. In the illustrated embodiment, controller 82 includes a processor 110 having memory 112 containing software configured to analyze inputs from various vehicle sensors for controlling differential 64.

As illustrated in FIG. 3, a user interface 85 may be provided for the operator to access controller 82, for example, to modify settings or to enter instructions. User interface 85 may be of conventional design, such as a keypad or control panel, and may be positioned within cab 30. User interface 85 may include a display for providing an operator with vehicle information, such as vehicle speed, diagnostics, differential feedback, sensor information, or other vehicle parameters.

In one embodiment, when vehicle 10 is positioned on an incline or slope with front wheel assembly 32 positioned higher than rear wheel assembly 33, vehicle 10 may experience a weight transfer towards rear wheels 40, 42. In other words, the weight distribution of vehicle 10 shifts towards the rear of vehicle 10 when vehicle 10 is positioned on a slope with the back of trailer portion 16 facing down the slope. This weight transfer may cause reduced traction of front wheels 34a, 34b, thereby limiting the braking force of front axle 54 and front wheels 34a, 34b applied to the ground. For example, the application of front brake 102 to front axle 54 results in a front axle braking force applied to the ground with wheels 34a, 34b. This front axle braking force may be reduced when vehicle 10 is inclined up a slope due to reduced traction of wheels 34a, 34b.

In the illustrated embodiment, braking system 80 is configured to provide additional braking capacity to vehicle 10 in certain operating conditions. In particular, braking system 80 is configured to transfer braking torque from front axle assembly 50 to bogie axle assembly 52 when vehicle 10 is reversing down a slope and when vehicle 10 is substantially stopped at an incline on a slope, as described herein. To achieve additional braking capacity to bogie axle assembly 52, controller 82 is configured to automatically engage differential lock 94 of differential 64 based on various control inputs to transfer braking torque from front axle assembly 50 to bogie axle assembly 52. By locking differential 64, first and second portions 70, 72 of drive shaft 56 are locked to rotate together. As such, braking force applied to front axle 54 is configured to transfer to rear axles 58, 60 via drive shaft 56.

In one embodiment, lock 94 comprises a clutch assembly. In one embodiment, the amount of braking torque transferred from front axle assembly 50 to bogie axle assembly 52 with lock 94 engaged may be limited to the frictional holding capacity of the clutch of lock 94. In particular, the maximum front axle braking torque transferred by drive shaft 56 to bogie axle assembly 52 may limited to the maximum frictional holding force capacity of the clutch plates of lock 94.

In the illustrated embodiment, controller 82 causes the automatic engagement of differential lock 94 based on inputs 96 from vehicle sensors 114. Inputs 96 may include the driving direction of vehicle 10, the speed of vehicle 10, the slope of the ground, the position of brake input device 100, the applied brake pressure, and/or the weight distribution of vehicle 10. Fewer or additional inputs 96 may be provided to controller 82 for controlling differential 64. In the illustrated embodiment, sensors 114 include a speed sensor 83, a direction sensor 84, a slope sensor 86, a brake position sensor 88, and a brake pressure sensor 90 in communication with controller 82. In one embodiment, sensors 114 further include one or more weight sensors 92 for detecting the weight distribution of vehicle 10.

Speed sensor 83 is configured to measure the speed of vehicle 10 and provide a signal to controller 82 representative of the measured speed. Speed sensor 83 may measure the wheel speed, transmission speed, and/or engine speed of vehicle 10. Direction sensor 84 detects forward or reverse movement of vehicle 10 and provides a signal to controller 82 indicative of the detected moving direction of vehicle 10. In one embodiment, direction sensor 84 and speed sensor 83 are provided with a single sensor. In one embodiment, speed sensor 83 includes a variable reluctance or Hall effect sensor, but any suitable sensor 83 for detecting speed and/or direction may be used.

Slope sensor 86 is configured to measure the slope of the ground under vehicle 10 (i.e., the inclination angle of vehicle 10) and provide a signal representative of the measured ground slope to controller 82. Slope sensor 86 may comprise a conventional inclinometer or another suitable slope angle sensor. Brake position sensor 88 is configured to provide a signal to controller 82 representative of the position of brake input device 100. For example, brake position sensor 88 may include a conventional potentiometer coupled to a foot pedal or lever of brake input device 100 to measure the travel distance of brake input device 100. Other suitable brake position sensors 88 may also be used. Brake pressure sensor 90 is configured to measure the brake pressure applied by front brakes 102 and/or rear brakes 104 and to provide a signal or signals representative of the measured brake pressures to controller 82.

Fewer or additional sensors 114 may provide inputs 96 to controller 82 for controlling differential 64 and differential lock 94. For example, brake system 80 may further include one or more weight sensors 92 for measuring the weight supported by front wheel assembly 32 and/or rear wheel assembly 33. In one embodiment, a weight sensor 92 is coupled to each of left and right rear wheel assemblies 36a, 36b for independently measuring the weight supported by each rear wheel assembly 36a, 36b and providing signals indicative of the measured loads to controller 82. Trailer portion 16 and any load contained therein may contribute to the measured weight at rear wheel assembly 33. In some conditions, the weight of cab portion 12 may also contribute to the weight on wheel assemblies 36a, 36b.

In one embodiment, each weight sensor 92 includes a strain gauge mounted to a structure of rear wheel assembly 33, such as walking beam 44, for example, for detecting the weight of vehicle 10. See, for example, weight sensor 92 mounted to walking beam 44 illustrated in FIG. 6. Referring to FIG. 6, strain gauge or weight sensor 92 is positioned in a cavity 65 located in a top surface 45 of walking beam 44. In the illustrated embodiment, sensor 92 and cavity 65 are positioned near a center portion of walking beam 44 and above shaft 46 for detecting the load on beam 44, although sensor 92 may be positioned in other suitable positions. A cover 67 is provided in cavity 65 to substantially enclose sensor 92 within cavity 65. In one embodiment, a seal is provided between cover 67 and the surface forming cavity 65 to provide a sealed enclosure for sensor 92. A sensor cable 69 is configured to couple sensor 92 to controller 82 for providing feedback to controller 82. Alternatively, weight sensors 92 may include other suitable types and may be mounted at other locations suitable for measuring the weight supported by rear wheel assembly 33.

In one embodiment, one or more weight sensors 92 are coupled to front wheel assembly 32 for measuring weight supported by front wheel assembly 32. In one embodiment, based on the input from weight sensors 92, controller 82 may compare the measured weights on rear wheel assemblies 36a, 36b and front wheel assembly 32 to determine the weight distribution of vehicle 10.

Figure 4:
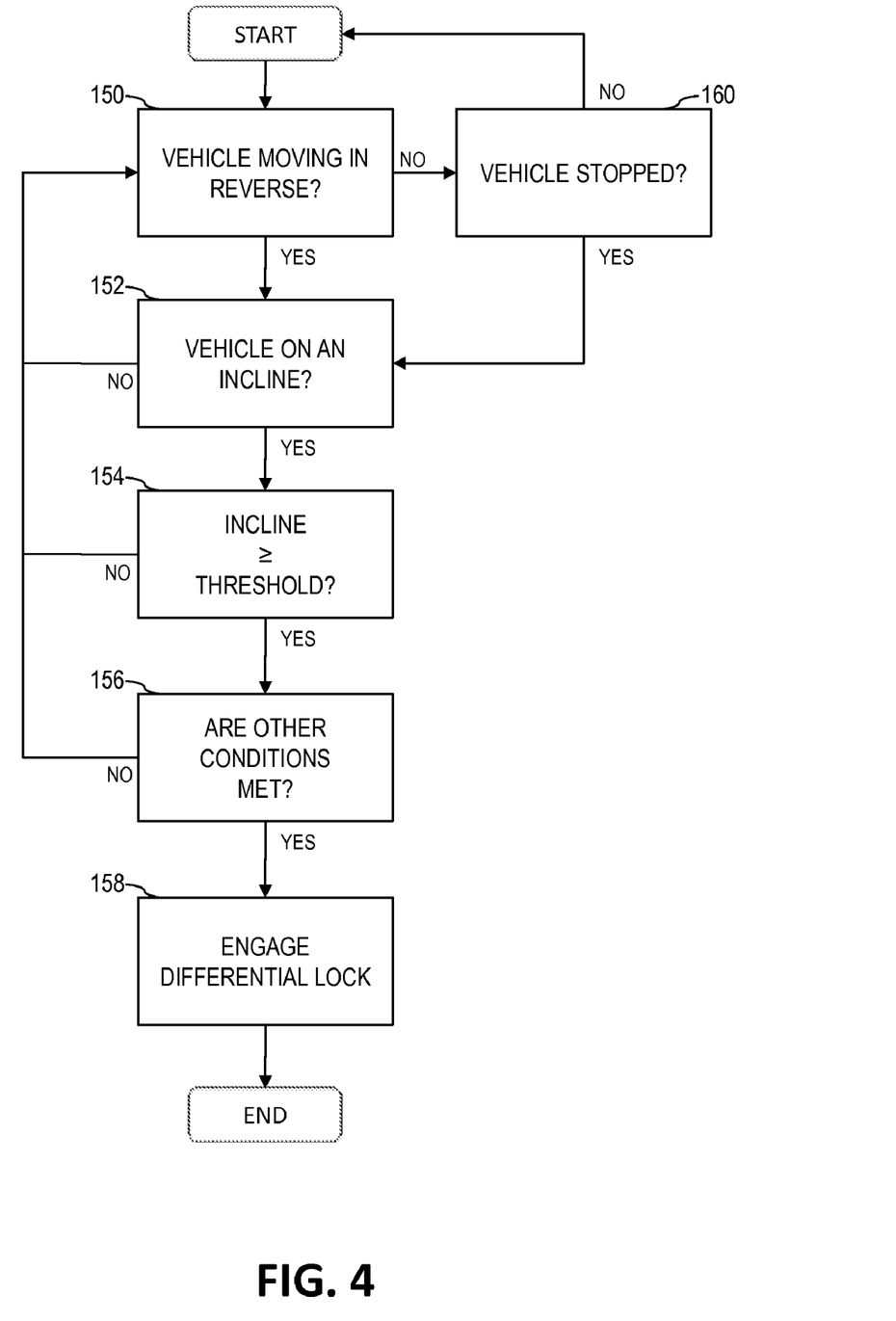
FIG. 4 illustrates an exemplary method of providing additional braking capacity to the vehicle of FIG. 1.

Referring to FIG. 4, an exemplary method of providing additional braking capacity to vehicle 10 is illustrated. The following describes the method of FIG. 4 with reference to braking system 80 of FIG. 3. At block 150, controller 82 determines the moving direction of vehicle 10 with direction sensor 84. If vehicle 10 is not moving in reverse, controller 82 determines at block 160 whether vehicle 10 is stopped based on feedback from speed sensor 83. In one embodiment, vehicle 10 is considered stopped if the detected vehicle speed is substantially zero. Alternatively, vehicle 10 may be considered stopped at block 160 if vehicle 10 is moving at a minimal forward speed, for example, less than 3 miles per hour. If vehicle 10 is either moving in reverse or stopped, controller 82 determines at block 152 if vehicle 10 is positioned on an incline (i.e., if front wheel assembly 32 is positioned vertically above rear wheel assembly 33). If vehicle 10 is positioned on an incline, controller 82 determines at block 154 if the inclination angle of vehicle 10 exceeds a minimum threshold angle. In one embodiment, the minimum threshold angle is three degrees. In one embodiment, the minimum threshold angle is five degrees. In one embodiment, the minimum threshold angle is ten degrees. Other suitable minimum threshold angles may be used.

If vehicle 10 is positioned up a slope having an angle of inclination greater than the minimum threshold angle, controller 82 may determine at block 156 if other conditions are met. For example, controller 82 may check the position of brake input device 100 with brake position sensor 88 to determine if the operator has engaged the brakes. If brake input device 100 is engaged or if brake input device 100 has moved a predetermined distance, controller 82 may proceed to block 158 to engage differential lock 94. In one embodiment, controller 82 may further check the brake pressure of front brakes 102 and/or rear brakes 104 at block 156 and proceed to block 158 if the brake pressure exceeds a predetermined minimum brake pressure. In one embodiment, controller 82 may proceed directly to block 158 after determining at block 154 that vehicle 10 is positioned on a slope having an angle of inclination greater than the minimum threshold angle.

At block 158, controller 82 engages lock 94 to lock differential 64, thereby locking first portion 70 of drive shaft 56 to second portion 72 of drive shaft 56 (see FIG. 2). As such, at least a portion of the front axle braking torque applied with front brakes 102 transfers to bogie axle assembly 52 to provide increased braking capacity to vehicle 10. In one embodiment, controller 82 disengages lock 94 upon at least one of the conditions of blocks 150, 152, 154, 156, and 160 no longer being satisfied. Alternatively, controller 82 may disengage lock 94 upon vehicle 10 moving forward or vehicle 10 no longer being positioned on a slope having the minimum threshold angle. Other conditions may also cause controller 82 to disengage lock 94.

In one embodiment, controller 82 may be configured to modulate or vary the holding capacity of lock 94 by adjusting the position of the clutch plates of lock 94. For example, controller 82 may allow the clutch of lock 94 to slip to reduce the frictional holding capacity of the lock 94. Controller 82 may vary the holding capacity of lock 94 based on various vehicle parameters.

In one embodiment, the weight supported by rear wheel assembly 33 and/or front wheel assembly 32 is calculated and considered by controller 82 in initiating the engagement of differential lock 94. For example, the minimum inclination angle required to engage lock 94 may be reduced when a larger vehicle payload is detected with weight sensors 92. In one embodiment, controller 82 may provide a stronger holding capacity with lock 94 when a larger payload is detected and a weaker holding capacity with lock 94 when a smaller payload is detected.

Figure 5A:
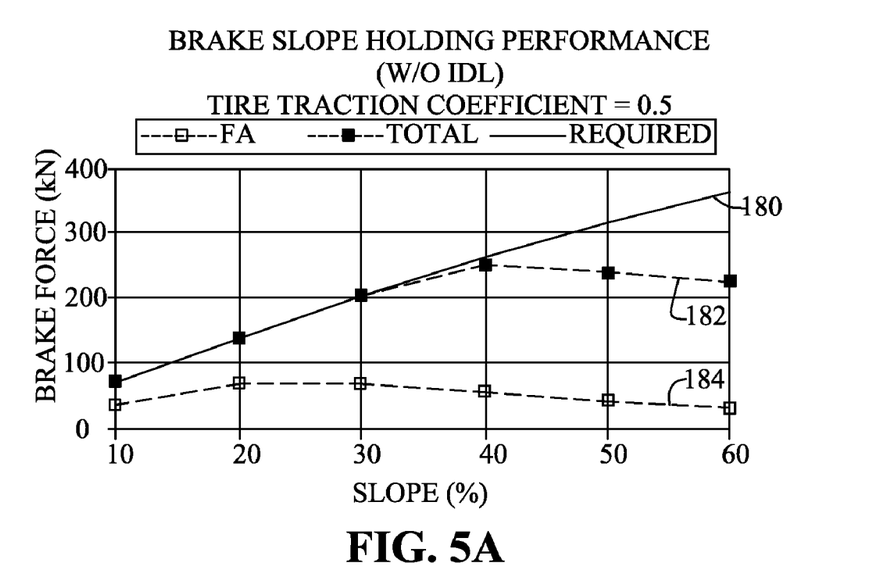
FIG. 5A illustrates an exemplary braking holding force of the vehicle of FIG. 1 with a disengaged inter-axle differential lock.
Figure 5B:
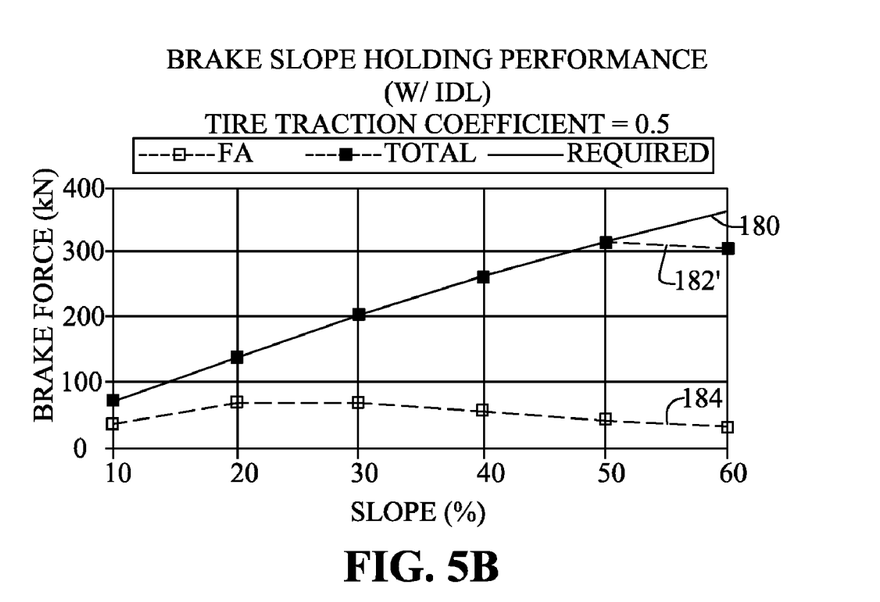
FIG. 5B illustrates an exemplary braking holding force of the vehicle of FIG. 1 with an engaged inter-axle differential lock.

Referring to FIGS. 5A and 5B, an exemplary braking force response is illustrated. FIGS. 5A and 5B each illustrate an exemplary brake holding force (measured in kilo-Newtons) of front and rear axles 54, 58, 60 based on the slope of the ground under vehicle 10. In other words, FIGS. 5A and 5B illustrate the braking torque transferred to the ground by front and rear brakes 102, 104. The ground slope is illustrated as a slope or grade percentage ranging from a 10% grade to a 60% grade. For example, at a 30% slope, the ground rises 30 units of vertical distance for every 100 units of horizontal distance. In FIGS. 5A and 5B, vehicle 10 is positioned up the slope such that front wheel assembly 32 is positioned vertically above rear wheel assembly 33 (i.e., the back of trailer portion 16 faces down the slope). In the illustrated embodiment, the tire traction coefficient of friction is 0.5.

Curve 180 of FIGS. 5A and 5B illustrates the brake holding force required to hold vehicle 10 stationary on the slope. Curve 184 of FIGS. 5A and 5B illustrates the brake holding force provided with front axle 54 to the ground. In particular, curve 184 illustrates the brake holding force transferred to the ground through front axle 54 with the engagement of brakes 102. As illustrated by curve 184, the potential brake holding force provided through front axle 54 is less than the required brake holding force for vehicle 10 for all slope levels.

Curve 182 of FIG. 5A illustrates an exemplary actual brake holding force applied to the ground with front and rear axles 54, 58, 60 when differential lock 94 of differential 64 is in an unlocked or disengaged state. In particular, curve 182 illustrates the combined brake holding force transferred to the ground through front axle 54 with brakes 102 and through rear axles 58, 60 with brake 104. Curve 182' of FIG. 5B illustrates an exemplary actual brake holding force applied to the ground with front and rear axles 54, 58, 60 when differential lock 94 of differential 64 is in a locked or engaged state. In particular, curve 182' illustrates the combined brake holding force transferred to the ground when the braking force of front brakes 102 is transferred from front axle 54 to rear axles 58, 60 through drive shaft 56.

Referring to FIG. 5A, when differential lock 94 is disengaged, the actual brake holding force 182 begins to deviate from the required braking force 180 at about a 30% slope and maxes out at about a 40% slope. Referring to FIG. 5B, when differential lock 94 is engaged, the actual brake holding force 182' transferred to the ground provides the required holding force 180 for ground slopes ranging from about 10% slope to about 50% slope before beginning to deviate from the required holding force 180 at about a 50% slope. As such, the engagement of differential lock 94 while vehicle 10 is positioned up a slope provides increased braking capacity to vehicle 10, particularly at slopes greater than 30%, as illustrated by curve 182' of FIG. 5B.

In one embodiment, lock 94 is automatically engaged when vehicle 10 is traveling down a slope. In particular, controller 82 may automatically engage lock 94 upon detection of vehicle 10 moving down a slope in either a forward or reverse direction. In one embodiment, controller 82 may automatically engage lock 94 upon detection of vehicle 10 moving in a reverse direction.

Braking system 80 may further include additional speed retarders 120 for slowing or braking vehicle 10, as illustrated in FIG. 3. For example, a transmission retarder 122 may be configured to slow the rotational speed of transmission 51 (see FIG. 2) under certain vehicle operating conditions. Transmission retarder 122 may include a hydrodynamic retarder and/or an electromagnetic retarder. An exhaust brake 124 and/or an engine braking system 126 may be further implemented in braking system 80 to facilitate speed reduction of vehicle 10. For example, exhaust brake 124 may include a valve, such as a butterfly valve, mounted in the exhaust of vehicle 10 for restricting airflow and slowing engine 31. Engine brake 126 may include an engine valve brake configured to increase compression in engine 31 to slow engine 31. In one embodiment, transmission retarder 122, exhaust brake 124, and/or the engine braking system 126 may be deactivated or ineffective when vehicle 10 is moving at a slow speed.

While braking system 80 is described herein with respect to articulated vehicle 10, braking system 80 may be implemented on other types of vehicles. For example, braking system 80 may be implemented in other work or utility vehicles such as a motor grader, a tractor, a bulldozer, a feller buncher, a crawler, an excavator, a skidder, or another utility vehicle. Similarly, braking system 80 may also be implemented in a commercial vehicle or other roadworthy motor vehicles.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains and which fall within the limits of the appended claims.

The invention claimed is:

1. A work vehicle including:
    a chassis;
    a front wheel assembly supporting the chassis and including a first axle and a pair of wheels coupled to the first axle;
    a front brake coupled to the front wheel assembly and configured to apply a braking force to the front wheel assembly to inhibit rotation of the first axle;
    a rear wheel assembly supporting the chassis and including a second axle and a pair of wheels coupled to the second axle;
    a drive shaft coupled between the front wheel assembly and the rear wheel assembly;
    a differential coupled to the drive shaft, the differential including a lock device configured to substantially block operation of the differential;
    a direction sensor configured to detect a moving direction of the vehicle;
    a controller in communication with the differential and the direction sensor, the controller being configured to engage the lock device upon detection of the vehicle moving in a reverse direction.

2. The work vehicle of claim 1, further including a slope sensor in communication with the controller, the slope sensor being configured to detect a slope of the ground, the controller engaging the lock device further upon detection of the vehicle reversing down a slope.

3. The work vehicle of claim 2, wherein the slope sensor is configured to detect an inclination angle of the vehicle, wherein the controller engages the lock device upon detection that the front wheel assembly is higher than the rear wheel assembly based on the inclination angle.

4. The work vehicle of claim 3, wherein the controller engages the lock device further upon the inclination angle being outside a threshold range.

5. The work vehicle of claim 1, the drive shaft including a first portion coupled between the front wheel assembly and the differential and a second portion coupled between the rear wheel assembly and the differential, wherein engagement of the lock device causes the first portion and the second portion of the drive shaft to rotate together.

6. The work vehicle of claim 5, wherein an application of the front brake is configured to apply braking torque to the front wheel assembly and to the rear wheel assembly when the lock device of the differential is engaged.

7. The work vehicle of claim 1, wherein the direction sensor comprises a speed sensor configured to detect a speed and the moving direction of the vehicle.

8. The work vehicle of claim 1, further including a brake input device and a brake position sensor, the brake input device being configured to provide an input to the controller to cause an actuation of the front brake, the brake position sensor being configured to detect a position of the brake input device, the controller engaging the lock device further upon the brake input device moving to a predetermined position.

9. The work vehicle of claim 1, further including a brake pressure sensor configured to detect the brake pressure of the front brake, the controller engaging the lock device further upon the detected brake pressure being outside a predetermined brake pressure range.

10. The work vehicle of claim 1, further including at least one weight sensor configured to measure weight supported by the front and rear wheel assemblies, the controller being configured to calculate a weight distribution of the vehicle on the front and rear wheel assemblies based on the measured weight supported by the front and rear wheel assemblies, the controller being configured to engage the lock device further upon the calculated weight distribution being outside a threshold weight distribution range.

11. A work vehicle including:
    a chassis;
    a front wheel assembly operably coupled to the chassis to support the chassis, the front wheel assembly including a first axle and a pair of wheels coupled to the first axle;
    a rear wheel assembly operably coupled to the chassis to support the chassis, the rear wheel assembly including a second axle and a pair of wheels coupled to the second axle;
    a drive shaft coupled between the front wheel assembly and the rear wheel assembly;
    a differential coupled to the drive shaft, the differential including a lock device configured to substantially lock the differential;
    a first sensor configured to detect a slope of the ground;
    a second sensor configured to detect a speed of the vehicle; and
    a controller in communication with the differential and the first and second sensors, the controller being configured to engage the lock device upon detection of the vehicle being at least one of stopped on a slope and reversing on a slope.

12. The vehicle of claim 11, wherein the controller detects that the vehicle is stopped on a slope by detecting that the vehicle is stopped and that the front wheel assembly is higher than the rear wheel assembly.

13. The vehicle of claim 11, wherein the slope of the ground is detected based on output from the first sensor indicating an inclination angle of the vehicle, wherein the controller engages the lock device when the vehicle is at least one of stopped on a slope and reversing on a slope upon the inclination angle of the vehicle being outside a threshold range.

14. The vehicle of claim 11, further including a front brake coupled to the front wheel assembly and configured to apply a braking force to the first axle, wherein the front brake is configured to apply a braking force to the second axle via the drive shaft when the lock device of the differential is engaged.

15. The vehicle of claim 14, further including a brake pressure sensor configured to detect the brake pressure of the front brake, the controller engaging the lock device further upon the detected brake pressure being outside a predetermined brake pressure range.

16. The vehicle of claim 11, wherein the chassis further includes a cab portion, a trailer portion, and a coupling assembly positioned between the cab portion and the trailer portion, the cab portion including a first frame and the trailer portion including a second frame, the coupling assembly being configured to provide pivoting movement of the trailer portion relative to the cab portion, the front wheel assembly being coupled to the first frame and the rear wheel assembly being coupled to the second frame.

17. The vehicle of claim 11, wherein the lock device comprises a clutch assembly.

18. A work vehicle including:
a chassis;
a front wheel assembly coupled to the chassis to support the chassis, the front wheel assembly including a first axle and a pair of wheels coupled to the first axle;
a rear wheel assembly coupled to the chassis to support the chassis, the rear wheel assembly including a second axle and a pair of wheels coupled to the second axle;
a front brake coupled to the front wheel assembly and configured to apply a braking torque to the front wheel assembly to inhibit rotation of the first axle;
at least one sensor for detecting movement of the vehicle in a reverse direction;
a transfer means for transferring a braking torque from the front wheel assembly to the rear wheel assembly; and
a means for activating the transfer means based on a detection of the movement of the vehicle in the reverse direction by the at least one sensor.

19. The work vehicle of claim 18, wherein the means for activating the transfer means includes a controller having a processor, the controller being in communication with the at least one sensor and the transfer means.

20. The work vehicle of claim 19, further including an inclination sensor configured to detect an inclination angle of the vehicle.

21. The work vehicle of claim 20, wherein the controller further activates the transfer means based on detection of the vehicle being substantially stopped on a slope, the controller detecting the vehicle being substantially stopped on a slope based on output provided with the inclination sensor.

22. The work vehicle of claim 20, wherein the controller activates the transfer means further based on a movement of the vehicle down a slope, the controller detecting the movement of the vehicle down a slope based on output provided with the at least one sensor and the inclination sensor.

23. The work vehicle of claim 18, wherein the transfer means includes a drive shaft and a differential coupled to the drive shaft, the drive shaft being coupled between the front wheel assembly and the rear wheel assembly, the differential including a differential lock.

24. The work vehicle of claim 23, wherein the means for activating the transfer means includes a means for activating the differential lock of the differential.

25. The work vehicle of claim 11, further including at least one sensor in communication with the controller and operative to detect a weight of the vehicle, the controller determining a weight of the vehicle based on output provided with the at least one sensor, the controller adjusting the minimum threshold angle based on the determined weight of the vehicle.

26. A work vehicle including:
a chassis;
a front wheel assembly supporting the chassis and including a first axle and a pair of wheels coupled to the first axle;
a rear wheel assembly supporting the chassis and including a second axle and a pair of wheels coupled to the second axle;
a drive shaft coupled between the front wheel assembly and the rear wheel assembly;
a differential coupled to the drive shaft, the differential including a lock device configured to substantially lock the differential;
an inclination sensor configured to detect an inclination angle of the vehicle;
at least one weight sensor configured to detect a weight of the vehicle; and
a controller in communication with the differential, the inclination sensor, and the at least one weight sensor, the controller being operative to
detect the inclination angle of the vehicle based on output provided with the inclination sensor and detect a weight of the vehicle based on output provided with the at least one weight sensor,
engage the lock device based on the detected inclination angle of the vehicle exceeding a minimum threshold angle, and
adjust the minimum threshold angle based on the detected weight of the vehicle.

27. The work vehicle of claim 26, further including a bin configured to carry a load, the at least one weight sensor being positioned on the vehicle to detect a weight of the load carried by the bin, the controller decreasing the minimum threshold angle based on a detection of an increased weight of the load carried by the bin of the vehicle.

28. The work vehicle of claim 26, wherein the at least one weight sensor is positioned at the rear wheel assembly to detect a weight supported by the rear wheel assembly.

29. The work vehicle of claim 26, the rear wheel assembly including a first pair of wheels, a second pair of wheels positioned rearward of the first pair of wheels, and a tandem coupled to a wheel of the first pair of wheels and to a wheel of the second pair of wheels, the tandem being pivotally coupled to the chassis, the at least one weight sensor being mounted on the tandem for detecting a weight supported by the rear wheel assembly.

30. The work vehicle of claim 29, wherein the at least one weight sensor comprises a strain gauge.

31. The work vehicle of claim 26, wherein the vehicle further includes a sensor in communication with the controller and operative to detect a direction of the vehicle, wherein the controller engages the lock device upon the detected inclination angle of the vehicle exceeding the minimum threshold angle and the vehicle moving in a reverse direction.

* * * * *